No. 828,700. PATENTED AUG. 14, 1906.
A. M. AKIN.
PITMAN.
APPLICATION FILED JAN. 4, 1906.

WITNESSES:
C. C. Fuss.
S. H. Cobb.

INVENTOR
Asa M. Akin
BY Munn & Co.
ATTORNEYS

UNITED STATES PATENT OFFICE.

ASA M. AKIN, OF SPOKANE, WASHINGTON.

PITMAN.

No. 828,700. Specification of Letters Patent. Patented Aug. 14, 1906.

Application filed January 4, 1906. Serial No. 294,564.

*To all whom it may concern:*

Be it known that I, ASA M. AKIN, a citizen of the United States, and a resident of Spokane, in the county of Spokane and State of Washington, have invented a new and Improved Pitman, of which the following is a full, clear, and exact description.

My invention relates to pitmen, and especially to those designed for use in connection with agriculture-machines, such as headers and reapers, but may be employed wherever a connecting element of this character is desired. Its principal objects are to provide a device of this nature which may be readily adjusted to compensate for wear and effectively lubricated.

Reference is to be had to the accompanying drawings, forming a part of this specification, in which similar characters of reference indicate corresponding parts in all the figures.

Figure 1:
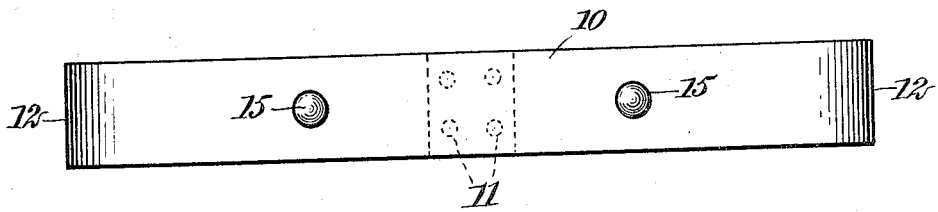
Figure 2:
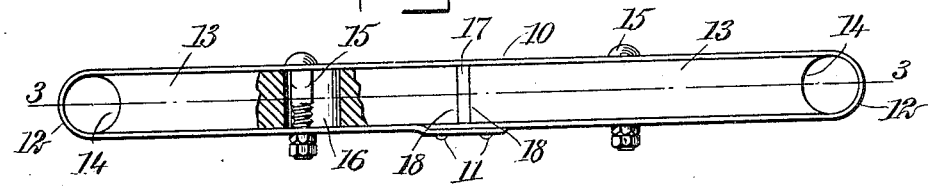
Figure 3:
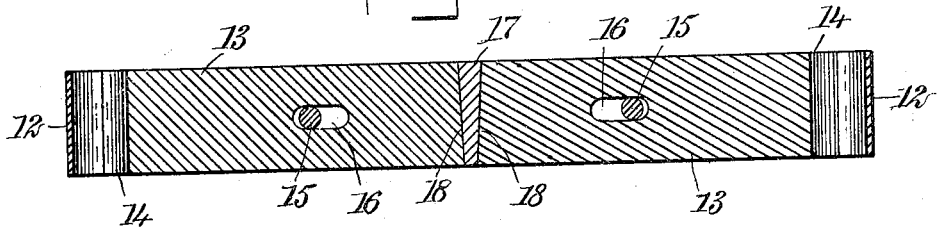
Figure 4:
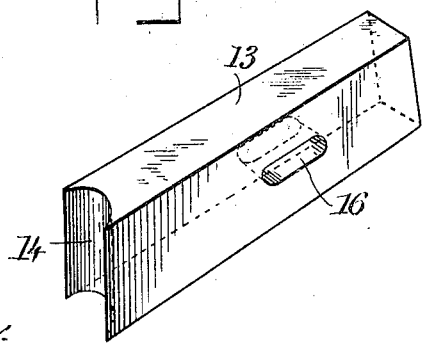

Figure 1 shows one embodiment of my invention in side elevation. Fig. 2 is a top plan view thereof, parts being broken away. Fig. 3 is a longitudinal section on the line 3 3 of Fig. 2, and Fig. 4 is a perspective view of one of the blocks.

The numeral 10 designates a frame which is preferably formed of comparatively thin metal which may be made continuous by being riveted at 11 and which has at the ends of its parallel sides outwardly rounded or convex portions 12. In the frame are situated opposite blocks 13 13, provided at their outer extremities with rounded depressions or concavities 14, furnishing, with the ends of the frame, openings to receive the elements to be connected. The blocks are preferably formed of some absorbent material, such as wood, which may be saturated with oil or the like, thus giving continuous lubrication which will prevent the bearing-surface from being cut out. The blocks are secured against displacement from the frame, while being permitted some longitudinal movement, by bolts 15, extending through elongated openings 16 in the blocks, these openings registering with opposite bolt-openings in the frame. By these bolts the blocks may be clamped in position by drawing the side walls of the frame against them. Means are also preferably provided for forcing the blocks from one another toward the ends of the frame to adjust the diameter of the openings. This is conveniently effected by a wedge 17, lying between the adjacent ends of the blocks which are inclined at 18 18 oppositely to the coöperating faces of the wedge.

It is believed that the application of the device will be obvious; but it may be said that when the blocks become worn by the friction of the crank-pins or other elements which they engage this may be taken up and the openings brought to their initial diameter by loosening the bolts and forcing the wedge farther between the blocks. Then the bolts are again tightened, clamping the parts in place.

Having thus described my invention, I claim as new and desire to secure by Letters Patent—

1. A pitman comprising a frame composed of parallel side members connected by outwardly-curved end members and oil-saturated wooden blocks arranged in longitudinal alinement with the frame, said blocks having their outer ends provided with recesses coöperating with the inner faces of the ends to form circular bearings, and having their inner ends inclined in opposite directions, said blocks being transversely slotted, bolts traversing the slots and openings in the side walls, and a wedge arranged between the inner ends of the blocks.

2. A pitman comprising a frame composed of parallel side members connected by outwardly-curved end members, blocks arranged in longitudinal alinement within the frame, said blocks having their outer ends provided with recesses coöperating with the inner faces of the ends to form circular bearings, and having their inner ends inclined in opposite directions, means for movably connecting the blocks with the frame, and a wedge arranged between the inner ends of the blocks.

In testimony whereof I have signed my name to this specification in the presence of two subscribing witnesses.

ASA M. AKIN.

Witnesses:
 D. A. AKIN,
 JEWEL M. PENIX.